Jan. 25, 1944.　　　H. N. RIDER　　　2,340,144
PRESSURE ACTUATED TUBE VALVE
Original Filed Nov. 2, 1942

Harry N. Rider
Inventor

W. B. Harpman
Attorney

Patented Jan. 25, 1944

2,340,144

UNITED STATES PATENT OFFICE 2,340,144

PRESSURE ACTUATED TUBE VALVE

Harry N. Rider, Youngstown, Ohio, assignor to "Automatic" Sprinkler Company of America, Youngstown, Ohio, a corporation of Delaware Original application November 2, 1942, Serial No. 464,169. Divided and this application March 26, 1943, Serial No. 480,717

5 Claims. (Cl. 169—20)

This invention relates to a control valve and more particularly to a pressure actuated expansible tube valve particularly adapted for fluid control.

The principal object of the invention is the provision of a pressure actuated expansible tube valve wherein fluid pressure, the flow of which is controlled by the valve, is utilized to effect such control.

A further object of the invention is the provision of a fluid pressure actuated expansible tube valve incorporating means for creating and utilizing a differential in fluid pressures for maintaining the said valve in open or closed relation to the fluid passageway therethrough.

A further object of the invention is the provision of a fluid pressure expansible tube valve wherein fluid pressure controlled by the valve serves to effectively hold a clapper of the said valve in closed position.

A still further object of the invention is the provision of a fluid pressure actuated control valve of the expansible tube type that the relief of fluid pressure from a portion of the valve structure results in the valve opening and permitting the free flow of fluid therethrough.

A still further object of the invention is the provision of a fluid pressure actuated control valve capable of actuation by a valve release mechanism such as that shown in my co-pending application for patent, Serial No. 462,630 filed October 19, 1942.

The fluid pressure control valve shown and described herein constitutes an efficient and dependable means of controlling the flow of fluid, primarily fire extinguishing fluid, in a communication line such as a riser of a fire extinguishing system. The control valve is of a type wherein fluid pressure in the line being controlled is utilized to effect the valve operation and in so doing serves to block the flow of fluid through the valve. The valve is adapted to be opened by the relief, either manually or automatically, of the fluid pressure in the actuating portion of the valve which will overcome the differential normally existing and permit the valve to open.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein.

Figure 1:
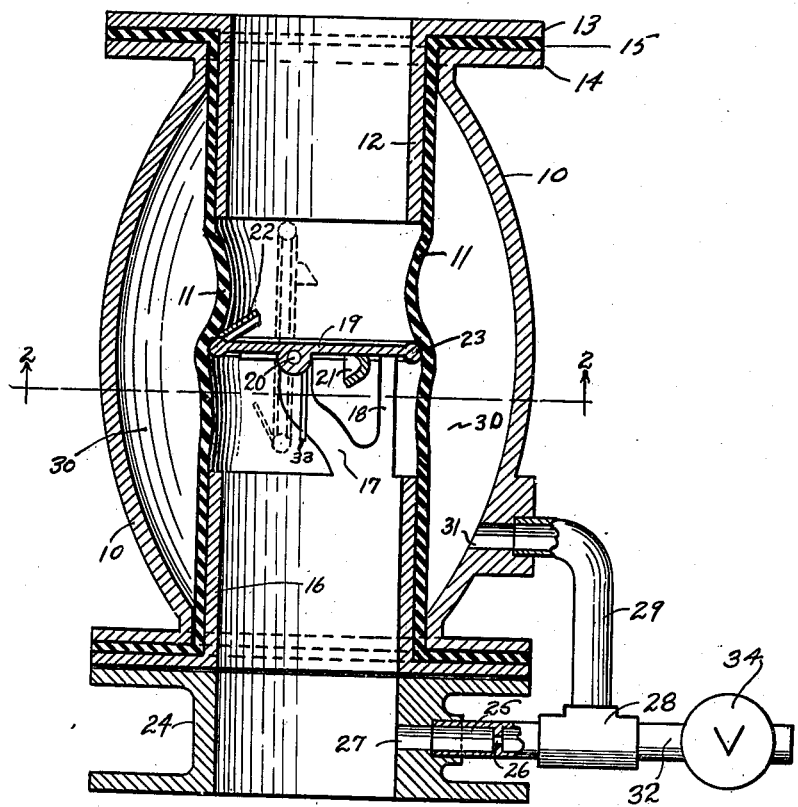
Figure 1 is a cross-sectional side elevation illustrating the pressure actuated control valve.
Figure 2:
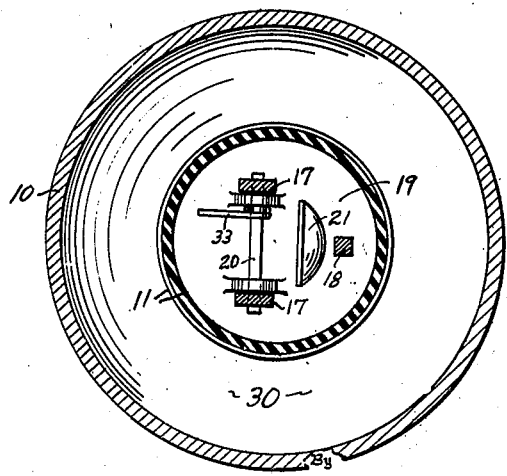
Figure 2 is a cross section elevation taken on lines 2—2 of Figure 1.

By referring to Figure 1 of the drawing, it will be seen that a fluid pressure actuated control valve is illustrated wherein the valve actuating element takes the form of an expansible tube, adapted to be moved by differentials of fluid pressure existing thereabout and which movement is utilized in controlling a clapper which comprises the actual fluid blocking mechanism of the valve. In Figure 1, a fluid pressure actuated valve housing is indicated by the numeral 10 and an expansible tube positioned therethrough is indicated by the numeral 11. The expansible tube 11 is held in position in the valve body 10 by means of a pair of somewhat similar fittings, one being indicated by the numeral 12, which forms in effect a sleeve positioned within the upper end of the interior of the expansible tube 11, an outwardly extending annular flange 13 of which, in connection with a similar flange 14 formed on the valve body 10, serve as an efficient means of positioning the expansible tube 11, as an outwardly extending annular flange 15 formed thereon is positioned between the annular flanges 13 and 14. The other one of the similar sleeve fittings referred to comprises a sleeve-like member 16 positioned in the opposite (lower) end of the valve body 10, and provides for the secure positioning of the other (lower) end of the expansible tube 11 in a manner the same as that described in connection with the positioning of the other (upper) end of the expansible tube 11.

The sleeve-like member 16 is provided with a pair of upwardly extending arms 17 and a stop member 18. The upwardly extending arms 17 are adapted to support and maintain in appropriate position a tiltable clapper 19 which is pivoted at one side of the axis of said sleeve to the upwardly extending arms 17 by means of a pivot 20. The clapper 19 is circular in shape, and its outer diameter is the same as the interior diameter of the expansible tube 11 in non-collapsed forms. A cup-like member 21 and a vane 22 are formed on opposite surfaces of the clapper 19 to insure the clappers remaining open while fluid is flowing through the valve.

The clapper 19 is provided with an annular enlarged rim 23, the periphery of which is rounded to facilitate the closure action effected between the same and the interior surface of the expansible tube 11, which action, as is illustrated in Figure 1, comprises the means by which the clapper 19 is held in closed position thereby blocking the flow of fluid which is brought into communication therewith through the sleeve-like member 16. A fitting 24 directly attached to the inlet side (lower) of the pressure actuated valve 10 forms the connection with a fluid supply line (not shown) while the other end (upper) or portion of the valve body 10 is adapted to communicate directly with a riser of a sprinkler system (not shown). A tube 25 incorporating a restriction 26 establishes communication with the interior of the fitting 24 through an opening 27 therein, and a T 28, and a secondary tube 29 connects the T 28 with a chamber 30 formed about the exterior of the expansible tube 11 in the valve body 10 by way of an opening 31 in the valve body 10. A tube 32 also communicates with the T 28 and forms a means of communication to a relief valve 34 which may be either manual or automatic and which relief valve 34 upon being opened will, due to the restriction 26 in the tube 25, cause the relief of pressure in the chamber 30 about the exterior of the expansible tube 11, which action will permit fluid pressure in the interior of the expansible tube 11 to move the same outwardly in an expanding action and thereby release the periphery of the clapper 19 which will permit it to pivot upon its pivot 20 and thus provide a relatively clear and unobstructed fluid passageway directly through the complete valve.

So that the valve may be closed, the clapper 19 is provided with a tensioning spring 33 which has the normal tendency of urging the clapper 19 into the position illustrated in Figure 1 wherein a portion thereof rests against the stop member 18. The tension of the spring 33 has to be overcome by the pressure of the fluid seeking its way through the valve at such times as the fluid pressure in the valve chamber 30 is relieved. The clapper action of the valve is, therefore, entirely automatic and subject to remote control by manual or automatic valve means in communication with the tube 32. It is understood that before the clapper can be reseated after opening, a gate valve in the supply line (not shown) must be closed to stop the flow of fluid through the pressure actuated control valve. After reseating, the gate valve is again opened as the pressure actuated tube valve itself controls the fluid supply line.

This application is a division of my co-pending application for patent on Pressure actuated control valve, Serial No. 464,169, filed November 2, 1942.

Having thus described my invention, what I claim is:

1. A pressure actuated valve comprising in combination a valve body having an expansible tube positioned therein so as to form a passageway therethrough, sleeve members positioned one in each end of the said valve body and extending inwardly therefrom within the said expansible tube, a tiltable clapper eccentrically pivoted within the said expansible tube on arms formed on one of the said sleeve members, means establishing communication between the interior of the said valve body about the exterior of the said expansible tube and the inlet portion of the said valve thereby equalizing the fluid pressure in the said inlet portion and in the space about the said expansible tube so as to partially collapse the said expansible tube about the said tiltable clapper and hold the same in closed position thereby blocking the passageway therethrough.

2. A fluid control valve of the expansible tube type and comprising a valve body having inlet and outlet openings therein, an expansible tube positioned in the said valve body so as to extend therethrough and form a passageway, a tiltable clapper eccentrically pivoted within the said expansible tube by means of a structural member also positioned within the said expansible tube, means forming a communication channel between a chamber defined by the interior of the valve body and the exterior of the expansible tube, means providing communication between the said chamber and the interior of the inlet portion of the said valve to equalize the fluid pressure and thereby to collapse the said expansible tube against the said tiltable clapper holding the same in closed position blocking the passageway through the said valve.

3. An expansible tube type control valve comprising a body member having an expansible tube positioned therethrough so as to form a passageway and including an eccentrically pivoted disc-like clapper positioned within the said expansible tube by means of suitable structural members also positioned within the said expansible tube, a secondary structural member positioned within the said expansible tube and serving as a stop member for the said pivoted disc-like clapper, spring means adapted to normally hold the said disc-like clapper against the said stop member in a position blocking the said passageway, a chamber formed about the exterior of the said expansible tube by the said valve body, means placing the said chamber in communication with the inlet portion of the said valve body to equalize the fluid pressures so as to partially collapse the said collapsible tube about the disc-like clapper and thereby form a closure in the said passageway.

4. A pressure actuated valve comprising in combination a valve body having a clapper eccentrically pivoted therein adapted to close a passageway therethrough, a pressure actuated expansible tube normally engaging the said clapper so as to retain it in closed position and means establishing communication between the space between the said tube and the said valve body and the inlet portion of the said valve.

5. A pressure actuated valve comprising in combination a valve body having a clapper eccentrically pivoted therein adapted to close a passageway therethrough, a pressure actuated expansible tube normally engaging the said clapper so as to retain it in closed position, means establishing communication between the space between the said tube and the said valve body and the inlet portion of the said valve, and valve means for equalizing pressures on both sides of the said expansible tube so as to permit the said clapper to open.

HARRY N. RIDER.